(12) United States Patent
Wang et al.

(10) Patent No.: US 12,713,110 B2
(45) Date of Patent: Aug. 18, 2026

(54) IMAGE PROCESSING METHOD AND APPARATUS, AND DEVICE AND STORAGE MEDIUM

(71) Applicant: Beijing Zitiao Network Technology Co., Ltd., Haidian District (CN)

(72) Inventors: Xingyi Wang, Beijing (CN); Daoyu Wang, Beijing (CN); Hui Sun, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 101 days.

(21) Appl. No.: 18/727,313

(22) PCT Filed: Mar. 6, 2023

(86) PCT No.: PCT/CN2023/079813
§ 371 (c)(1),
(2) Date: Jul. 8, 2024

(87) PCT Pub. No.: WO2023/169356
PCT Pub. Date: Sep. 14, 2023

(65) Prior Publication Data

US 2025/0159310 A1 May 15, 2025

(30) Foreign Application Priority Data

Mar. 8, 2022 (CN) ......................... 202210220225.2

(51) Int. Cl.
*H04N 21/81* (2011.01)

(52) U.S. Cl.
CPC ....... *H04N 21/816* (2013.01); *H04N 21/8106* (2013.01); *H04N 21/8153* (2013.01)

(58) Field of Classification Search
None
See application file for complete search history.

(56) References Cited

FOREIGN PATENT DOCUMENTS

| | | |
|---|---|---|
| CN | 105376651 A | 3/2016 |
| CN | 106331869 A | 1/2017 |

(Continued)

OTHER PUBLICATIONS

China National Intellectual Property Administration, Office Action and Search Report Issued in Application No. 202210220225.2, May 31, 2023, 13 pages. (Submitted with partial English translation).

(Continued)

*Primary Examiner* — Cai Y Chen
(74) *Attorney, Agent, or Firm* — Alleman Hall LLP

(57) ABSTRACT

A method of image processing, an apparatus, a device and a storage medium are provided. The method includes: acquiring at least one target image from an image set corresponding to a target image work in response to receiving a first preset triggering operation on a preset display interface, wherein the target image work is displayed in a preset display form in the preset display interface, and the target image work includes at least one of an image work to-be-posted or a posted image work; and acquiring a target audio corresponding to the at least one target image and generating a target video with the at least one target image and the target audio, wherein the target video is set to be storable.

20 Claims, 7 Drawing Sheets

Acquiring at least one target image from an image set corresponding to a target image work in response to receiving a first preset triggering operation on a preset display interface, wherein the target image work is displayed in a preset display form in the preset display interface, and the target image work includes at least one of an image work to-be-posted or a posted image work

101

Acquiring a target audio corresponding to the target image, and generating a target video with the at least one target image and the target audio, wherein the target video is configured to be savable

102

(56) References Cited

FOREIGN PATENT DOCUMENTS

| | | | | | |
|---|---|---|---|---|---|
| CN | 108763385 | A | | 11/2018 | |
| CN | 108965599 | A | | 12/2018 | |
| CN | 109151568 | A | | 1/2019 | |
| CN | 110309351 | A | | 10/2019 | |
| CN | 110381356 | A | | 10/2019 | |
| CN | 111010611 | A | | 4/2020 | |
| CN | 114584716 | A | | 6/2022 | |
| CN | 107124624 | B | * | 9/2022 | ......... H04N 21/8113 |
| CN | 114584716 | B | | 7/2024 | |
| WO | 2015147437 | A1 | | 10/2015 | |

OTHER PUBLICATIONS

China National Intellectual Property Administration, Office Action and Search Report Issued in Application No. 202210220225.2, Aug. 31, 2023, 14 pages. (Submitted with partial English translation).

China National Intellectual Property Administration, Office Action and Search Report Issued in Application No. 202210220225.2, Dec. 4, 2023, 13 pages. (Submitted with partial English translation).

Jinzhuanzhuli, "How to save memories in the memory feature as a video file on iPhone," Baidu Experience, Available Online at https://jingyan.baidu.com/article/ff42efa92123f0c19e220217.html, Oct. 20, 2016, 16 pages.

ISA China National Intellectual Property Administration, International Search Report Issued in Application No. PCT/CN2023/079813, Jun. 22, 2023, 12 pages. (Submitted with partial English translation).

* cited by examiner

IMAGE PROCESSING METHOD AND APPARATUS, AND DEVICE AND STORAGE MEDIUM

CROSS-REFERENCE TO RELATED APPLICATIONS

The present disclosure is the national stage of International Patent Application No. PCT/CN2023/079813, filed on Mar. 6, 2023, which claims the priority to and benefits of Chinese Patent Application No. 202210220225.2, which was filed on Mar. 8, 2022 with the Chinese Patent Office. All the aforementioned patent applications are hereby incorporated by reference in their entireties.

TECHNICAL FIELD

Embodiments of the present disclosure relate to the field of computer technology, for example, to an image processing method, apparatus, device, and storage medium.

BACKGROUND

With the continuous development of Internet technology, an Application (APP) can present a wide variety of multimedia contents to users, and different users can share their own works with each other in a form of multimedia content such as posting images.

SUMMARY

Embodiments of the present disclosure provide an image processing method, apparatus, storage medium, and device, which can enable more convenient sharing of image works between users.

In a first aspect, an embodiment of the present disclosure provides an image processing method, including:

- acquiring at least one target image from an image set corresponding to a target image work in response to receiving a first preset triggering operation on a preset display interface, wherein the target image work is displayed in a preset display form in the preset display interface, and the target image work includes at least one of an image work to-be-posted or a posted image work; and
- acquiring a target audio corresponding to the target image, and generating a target video with the at least one target image and the target audio, wherein the target video is configured to be storable.

In a second aspect, an embodiment of the present disclosure provides an image processing apparatus, including:

- an image acquisition module configured to acquire at least one target image from an image set corresponding to a target image work in response to receiving a first preset triggering operation on a preset display interface, wherein the target image work is displayed in a preset display form in the preset display interface, and the target image work includes at least one of an image work to-be-posted or a posted image work;
- an audio acquisition module configured to acquire a target audio corresponding to the at least one target image; and
- a video generation module configured to generate a target video with the at least one target image and the target audio, wherein the target video is configured to be storable.

In a third aspect, an embodiment of the present disclosure provides an electronic device, including a memory, a processor, and a computer program stored on the memory and being executable by the processor, in which when the computer program is executed by the processor, the processor implements the image processing method as provided by an embodiment of the present disclosure.

In a fourth aspect, an embodiment of the present disclosure provides a computer-readable storage medium on which a computer program is stored and, in which when the computer program is executed by a processor, the processor implements the image processing method as provided by an embodiment of the present disclosure.

DETAILED DESCRIPTION

Figure 1:
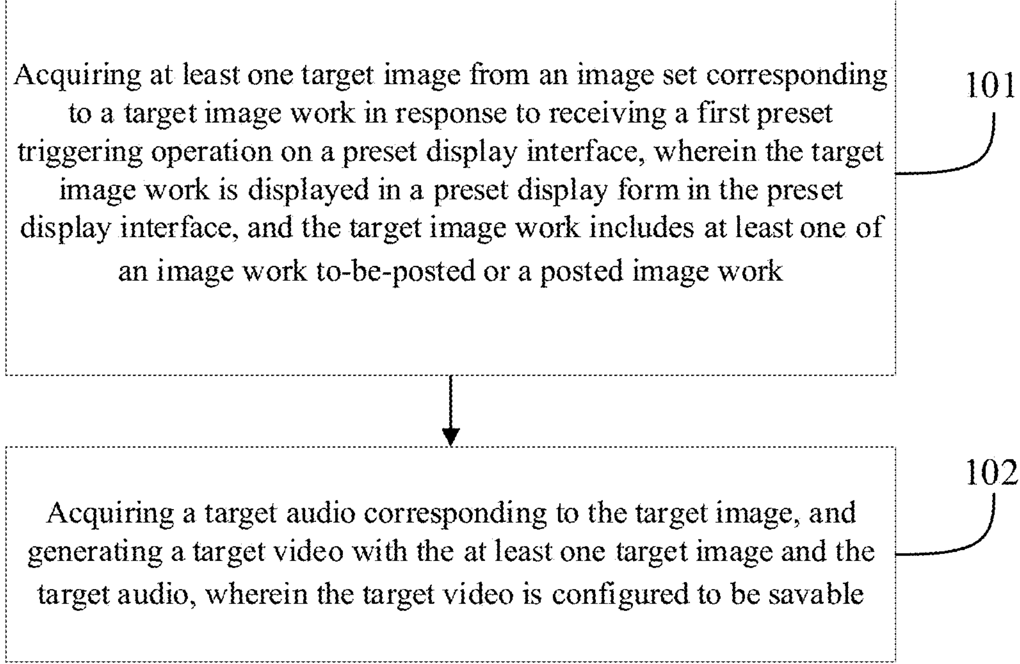
FIG. 1 is a flowchart schematic diagram of an image processing method according to an embodiment of the present disclosure.

Embodiments of the present disclosure will be described below with reference to the accompanying drawings. While certain embodiments of the present disclosure are shown in the drawings, it should be understood that the present disclosure may be embodied in various forms, and that these embodiments are provided for a more thorough and complete understanding of the present disclosure. It should be understood that the figures and examples of the present disclosure are for exemplary purposes only.

It should be understood that the various steps recited in the method implementation of the present disclosure may be executed in a different order, and/or in parallel. Further, the method implementation may include additional steps and/or omit performing illustrated steps.

As used herein, the term “include” and variations thereof are open inclusion, that is, “including, but not limited to”. The term “based on” is “based at least in part on.” The term “one embodiment” means “at least one embodiment”; The term “another embodiment” means “at least one additional embodiment”; The term “some embodiments” means “at least some embodiments”. Relevant definitions for other terms will be given in the description below.

Note that the concepts of “first”, “second”, and the like mentioned in the present disclosure are used only to distinguish different devices, modules, or units, and are not used to limit the order or interdependence of functions performed by these devices, modules, or units.

It needs to be noted that the modifications referred to in the present disclosure as “a” or “a plurality” are schematic and those skilled in the art should understand that they should be understood as “one or more” unless the context clearly dictates otherwise.

The names of messages or information interacted between devices in an implementation of the present disclosure are for illustrative purposes only.

In the following embodiments, optional features and examples are provided in each embodiment, the various features described in the embodiments may be combined to form a plurality of alternatives, and each numbered embodiment should not be considered as only one solution.

In the related art, an image work, as a form of work, is favored by a plurality of users. The image work generally includes audio and a plurality of images independently of each other, and when the image work is displayed, the images are sequentially displayed during playback of the audio. When the image work needs to be saved, storing of image format is only supported in unit of each image, for example, as a file in Gif or Jpg format.

FIG. 1 is a schematic flow diagram of an image processing method according to an embodiment of the present disclosure, which may be executed by an image processing apparatus, wherein the apparatus may be implemented by software and/or hardware, and may be generally integrated in an electronic device. The electronic device may be a mobile device such as a cell phone, a smart watch, a tablet computer, and a personal digital assistant; or other devices such as a desktop computer. As shown in FIG. 1, the method includes the following steps.

S101, acquiring at least one target image from an image set corresponding to a target image work in response to receiving a first preset triggering operation on a preset display interface, wherein the target image work is displayed in a preset display form in the preset display interface, and the target image work includes at least one of an image work to-be-posted or a posted image work.

In an embodiment of the present disclosure, the preset display interface may be a page in a preset application, and the preset application may provide an image work display function and may also provide an image work posting function. That is, a user may view his own image work or those posted by others in the preset application, and may also post an image work in the preset application. The image work includes a plurality of images and may also include an audio. The plurality of images form an image set. The images may include at least one of image content or text content. The images of the image work are stored in an image format, generally stored in a service terminal or a local electronic device corresponding to the preset application.

The preset display interface is used for displaying the image work, and the target image work can be understood as the image work currently displayed in the preset display interface. In the preset display interface, the target image work is displayed in a preset display form. For example, the preset display form may include sequentially displaying the images of the image set; when the image work further includes an audio, the preset display form may include sequentially displaying the images of the image set during playing the preset audio, wherein the preset audio is the audio included in the image work. Exemplarily, the images may be sequentially displayed according to the serial numbers in the image set, single show duration of each image may be set by default by the preset application or autonomously by the author (i.e., the user who creates the target image work), etc. When all the images have been displayed once, it may be considered that a first round of showing ends, and further rounds of showing may be performed thereafter.

For example, when the image set of the target image work contains 4 images, denoted as image a, image b, image c, and image d, respectively, and the preset audio is audio e, and a single show duration of each image is 2 seconds. Then when the target image work is started to show in the preset application, the audio e is played and the image a is shown. After the show duration of the image a reaches 2 seconds, it is switched to show the image b, after the show duration of the image b for reaches 2 seconds, it is switched to show the image c, and so on, until the display of the target image work is exited (e.g., switching to display the next image work or the preset display interface is closed, etc.).

Exemplarily, when the target image work is an image work to-be-posted, the preset display interface may be a page for previewing the image work to-be-posted, in which case the user facing the preset display interface is the author of the image work to-be-posted. When the target image work is a posted image work, the preset display interface may be a page for displaying the posted image work, and in this case, the user facing the preset display interface may include the author of the posted image work and any user other than the author.

Exemplarily, the first preset triggering operation may be an operation for triggering video generation. The at least one target image may include all or part of the images in the image set corresponding to the target image work. The at least one target image may be acquired from a storage location of the target image work, such as a service terminal corresponding to the preset application.

Figure 2:
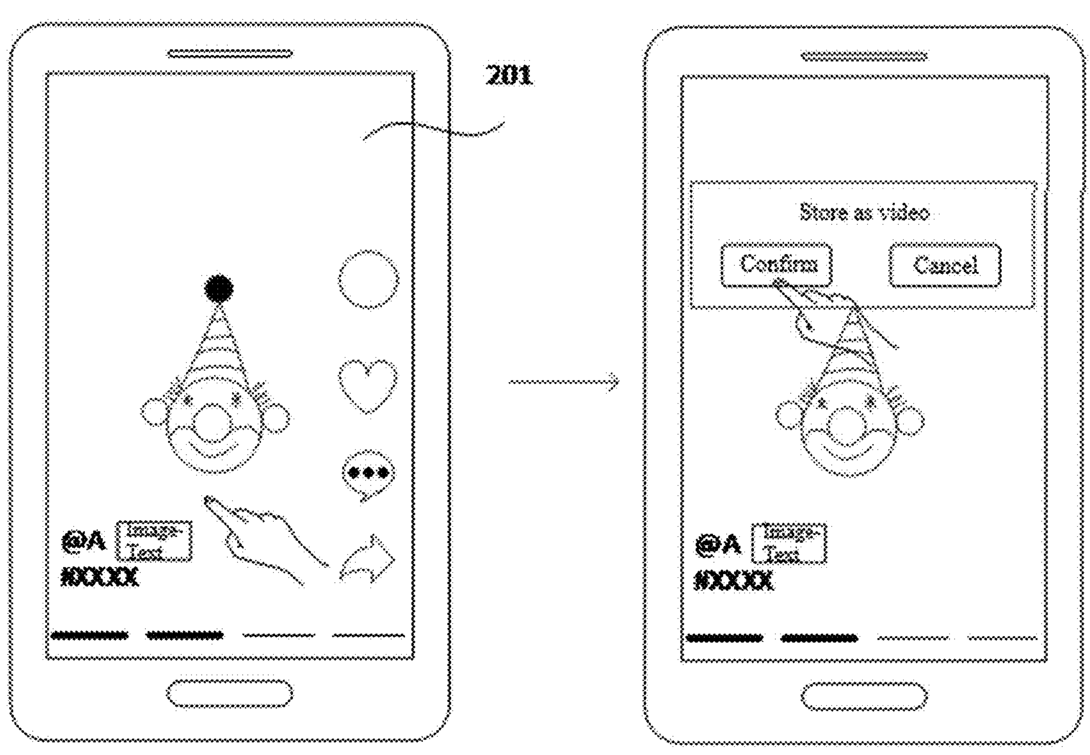
FIG. 2 shows an interface interaction diagram of an image processing method according to an embodiment of the present disclosure.
Figure 2:
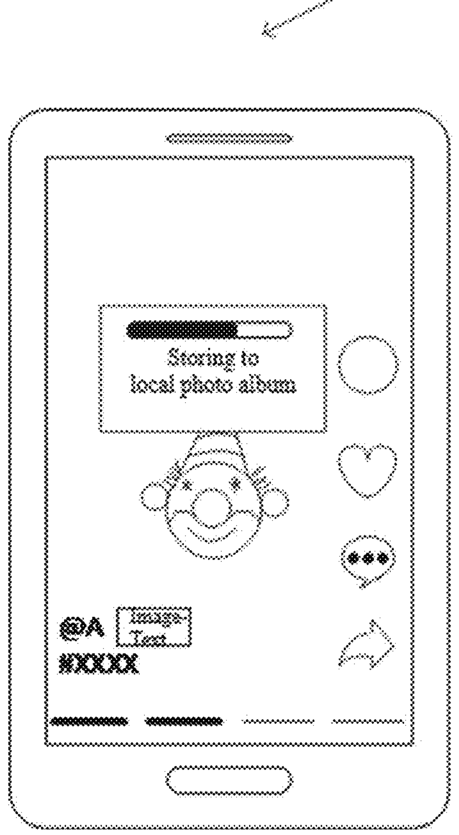

FIG. 2 is a schematic diagram of an interface interaction of an image processing method according to an embodiment of the present disclosure. As shown in FIG. 2, a target image work is being displayed in a preset display interface 201, wherein a second image in an image set is currently being displayed. A user inputs a preset operation, such as a long press operation, on the preset display interface 201 to show an option whether to store as a video. When the user clicks a confirm button (corresponding to inputting a first preset trigger operation), it is confirmed that the user needs to save the target image work as the video, then the target image is acquired from the image set corresponding to the target image work.

S102, acquiring a target audio corresponding to the target image, and generating a target video with the at least one target image and the target audio, wherein the target video is configured to be storable.

Exemplarily, the user who performs the image storing operation on the preset display interface is the author of the target image work, and the target audio may be the first audio in the target image work, a part of the first audio, or a second audio other than the preset audio. When the target audio is the first audio or the part of the first audio, the target audio may be acquired from a storage location of the target image work (e.g., a service terminal corresponding to the preset application). When the target audio is the second audio other than the preset audio, the target audio may be acquired according to an actual storage location of the target audio (e.g., the local electronic device, or a service terminal corresponding to the preset application, etc.).

Exemplarily, after acquiring the target image and the target audio, the target image and the target audio may be synthesized to obtain the target video. For example, the target video is synthesized by using all or part of audio data in the target audio as audio data in the target video, and using each target image as at least one set of consecutive video frames in the target video.

An image processing method provided in an embodiment of the present disclosure, acquiring at least one target image from an image set corresponding to a target image work in response to receiving a first preset triggering operation on a preset display interface, wherein the target image work is displayed in a preset display form in the preset display interface, and the target image work includes at least one of an image work to-be-posted or a posted image work; and acquiring a target audio corresponding to the target image, and generating a target video with the at least one target image and the target audio, wherein the target video is configured to be storable. By adopting the above technical solution, a completely new way of processing an image work is provided, which can be saved in video form or forwarded outside the current application, and which can enable easier sharing of the image work between users.

In some embodiments, after the target video is generated, the method further include: storing and/or forwarding the target video.

Exemplarily, the target video may be saved after it is acquired, be forwarded across applications, or be forwarded while storing the target video. A storing manner may include, for example, storing to a local folder of the electronic device, such as a photo album; it can also include storing to the preset application. A forwarding manner may include forwarding to a set application other than the preset application, such as a player application or an instant messaging type application, or the like. As shown in FIG. 2, the target video may be saved to a local photo album and the user is prompted in the preset display interface, such as showing a save progress bar.

In some embodiments, the target audio includes the preset audio, and the target image includes all images in the image set. Generating the target video with the at least one target image and the target audio includes: acquiring a preset image show order and a single-image single-show duration; and generating a target video using the target images and the target audio based on the image show order and the single-image single-show duration, wherein a playing order of the at least one target image in the target video coincides with the image show order, and a playing duration of a single target image in the target video coincides with the single-image single-show duration. The advantage of this arrangement is that all the images and the target audio in the target image work can be synthesized into the target video according to the preset image show order and the preset single image show duration, ensuring that the image material in the video coincides with the target image work.

Exemplarily, the preset image show order may be understood as a preset chronological order for showing the images in the image set on the preset display interface. The preset single-image single-show duration may be understood as a single duration for showing each image in the image set on the preset display interface, and the single show duration of images corresponding to different images may be the same or different. The preset image show order and the preset single-image single-show duration may be set by the user who creates the target image work or may be set by default by the preset application. As the example above, each of the 4 images has the single-image single-show duration of 2 seconds, assuming that the number of frames per second in the target video is 30, then the video image content of the 1st to 60th frames is the image a, constituting a continuous group of 60 video frames, and the video image content of the 61st to 120th frames is the image b, and so on. Alternatively, the target video may be generated according to a preset number of cycles when generating the target video, so that the number of playing times of each target image is equal to the preset number of cycles. For example, the preset number of cycles is 2, then the video image content of the 241st to 300th frames is the image a, i.e., there are two video frame groups.

In some embodiments, acquiring the preset image show order and the single image show duration includes: acquiring an image show order and a single-image single-show duration that are set by a user who creates the target image work as the preset image show order and the single-image single-show duration. This arrangement has the advantage of ensuring that the generated target video is initially consistent with the arrangement of the author of the target image work, and better preserves the original appearance of the image work.

In some embodiments, the preset display form includes showing images in the image set in sequence in a process of playing the preset audio; wherein acquiring the preset image show order and the single image show duration includes: acquiring an image show order and a single-image single-show duration corresponding to the preset display form as the preset image show order and the single-image single-show duration. The advantage of this arrangement is that when the target image work is displayed in the preset display form, the user's perception is like watching the video. The target video is generated in the preset display form, and a visual effect similar to that when the image work is displayed can be obtained.

In some embodiments, the preset audio is an audio set by a user who creates the target image work or the preset audio is an audio in the target image work.

In some embodiments, before acquiring at least one target image from the image set corresponding to the target image work corresponds in response to receiving the first preset triggering operation on the preset display interface, the method further including: showing at least two preset processing manner options corresponding to the target image work in the preset display interface in response to receiving a second preset triggering operation at the preset display interface, wherein the at least two preset processing manner options comprise a video generation option. Showing at least two preset processing manner options corresponding to the target image work in the preset display interface in response to receiving the second preset triggering operation at the preset display interface includes: acquiring at least one target image from an image set corresponding to the target image work in response to receiving a selection operation for the video generation option at the preset display interface. The advantage of such an arrangement is that it provides multiple ways of processing the target image work, which takes place when the user selects the video generation option.

Exemplarily, the at least two preset processing manner options may be shown in the form of an option list or an option card, or the like. The first preset triggering operation may be a selection operation (such as a click, etc.) acting on the video generation option. Optionally, the video generation option may also be refined, including a video storing option, a video forwarding option, and a video storing and forwarding option, and the like.

Optionally, the at least two preset processing manner options may include, for example, storing current image, storing selected image, storing the audio, or the like.

In some embodiments, the at least two preset processing manner options further comprise a current image acquisition option; wherein the in response to receiving the second preset triggering operation at the preset display interface, showing at least two preset processing manner options corresponding to the target image work in the preset display interface, includes: maintaining showing of a current image in the preset display interface in response to receiving the second preset triggering operation at the preset display interface, and displaying the at least two preset processing manner options corresponding to the target image work in the preset display interface. This arrangement has the advantage of supporting to acquire the currently shown image, enriching the processing manner of the image work, and the current image is maintained to be shown still when the preset processing manner option is triggered to be displayed, which is convenient for the user to accurately know the content of the image to be acquired at present. Optionally, the current image acquisition option may also be refined, including a current image storing option, a current image forwarding option, and a current image storing and forwarding option, and the like.

Optionally, the method may further include storing and/or forwarding the current image in response to receiving a selection operation for the current image acquisition option on the preset display interface.

Optionally, generating the target video with the at least one target image and the target audio includes: determining a target video generation manner, wherein the target video generation manner includes at least one selected from the group consisting of an image playing order, a single image playing duration, a playing switching effect of neighbor images, an association of an image playing timing and a tempo of the target audio, and a video playing total duration; and generating, based on the target video generation manner, the target video using the target image and the target audio. The advantage of such arrangement is that a richer way of video generation can be provided for the user. The target video generation manner may be set by default by the preset application, and may also be determined according to the setting operation of the current user.

Exemplarily, the current user may be the user who creates the target image work. When the target video generation manner includes an image playing order, the image playing order may be the same as or different from the image showing order corresponding to a preset display form. When the target video generation manner includes the single image playing duration, the single image playing duration corresponding to each target image may be the same or different, and the single image playing duration may be the same as or different from the single image single showing duration corresponding to the preset display form. The play switching effect of neighbor images may include an animation effect in a process of switching from playing a previous image to playing a subsequent image among neighbor two images. The tempo in the target audio can be detected to identify the target time point corresponding to the tempo, and the target time point is taken as the playing timing for each image. The playing timing can be understood as a playing moment of a first video frame being played in the video frame group to corresponding to the image.

Exemplarily, the current user may be a user other than the user who creates the target image work, then the current user may set the total duration for playing the video, i.e., the playing duration of all the images. The total duration for playing the video may be a product of the single show duration of all the target images corresponding to the preset display form and a preset coefficient, when the preset coefficient is less than 1 (e.g., 0.5), the playing effect of the target image in the target video may be made to achieve an effect of speeding up playing speed compared to a display effect of the target image work, and when the preset coefficient is greater than 1 (e.g., 2), the play effect of the target image in the target video can be made to achieve a slow play effect compared to the display effect of the target image work.

In some embodiments, determining the target video generation manner includes: acquiring at least one of an image source file corresponding to the target image or an audio source file of the target audio, and a descriptive file corresponding to the target image work, parsing at least one of the image source file or the audio source file, or the descriptive file, and loading a parsed result into a memory; acquiring at least one of first attribute information of the target image or second attribute information of the target audio based on the parsed result, determining a candidate video generation manner according to at least one of the first attribute information of the target image or the second attribute information of the target audio; and determining the target video generation manner according to a selection operation of a current user for the candidate video generation manner. Such an arrangement is advantageous in that a variety of video generation manners can be automatically provided to the user according to image attributes and audio attributes for selection by the user, and video generation efficiency can be improved while satisfying the user's personalized needs.

Exemplarily, the descriptive file may include relevant information for processing at least one of the target image or the target audio, for example, a type of effect (e.g., which may include filter effect, sticker, and voice changing, etc.) which may add media information (e.g., which may include a video, an audio, or an image, etc.) on the basis of the at least one of the target image or the target audio, a source of media information needed for achieving the effect, etc., may also include parameters for cutting, zooming and displaying, etc., the at least one of the target image or the target audio, and may also include a preset algorithms (e.g., a smart matting algorithm, a target tracking algorithm, and an audio click algorithm, etc.). After parsing at least one of the image source file or the audio source file, and parsing the descriptive file, the parsing result is loaded into the memory. At least one of first attribute information of the target image or second attribute information of the target audio may be acquired according to the parsing result, wherein the first attribute information may include image attribute information after the target image is processed according to the parsing result, such as an added effect or an applied preset algorithm, etc., and the second attribute information may include audio attribute information after the target audio is processed according to the parsing result, such as an added sound effect, etc. After the target video generation manner is determined, the corresponding parsed result can be acquired, and a corresponding editor instance is initialized, video synthesis is conducted by the editor instance, a processing result of a media file and a preset algorithm is loaded in a suitable position, and thus the target video is generated.

In some embodiments, acquiring the target image from the image set corresponding to the target image work includes: acquiring a corresponding target image according to a selection operation of a current user for an image in the image set corresponding to the target image work. Illustratively, the author is allowed to autonomously select a part of images from the image configured to participate in the generation of the target video which would increase the flexibility of video generation.

In some embodiments, acquiring the target audio corresponding to the target image includes: acquiring the target audio corresponding to the target image according to an audio selection operation of a current user. Illustratively, a the author is allowed to autonomously select a part of images from the image configured to participate in the generation of the target video which would increase the flexibility of video generation.

Figure 3:
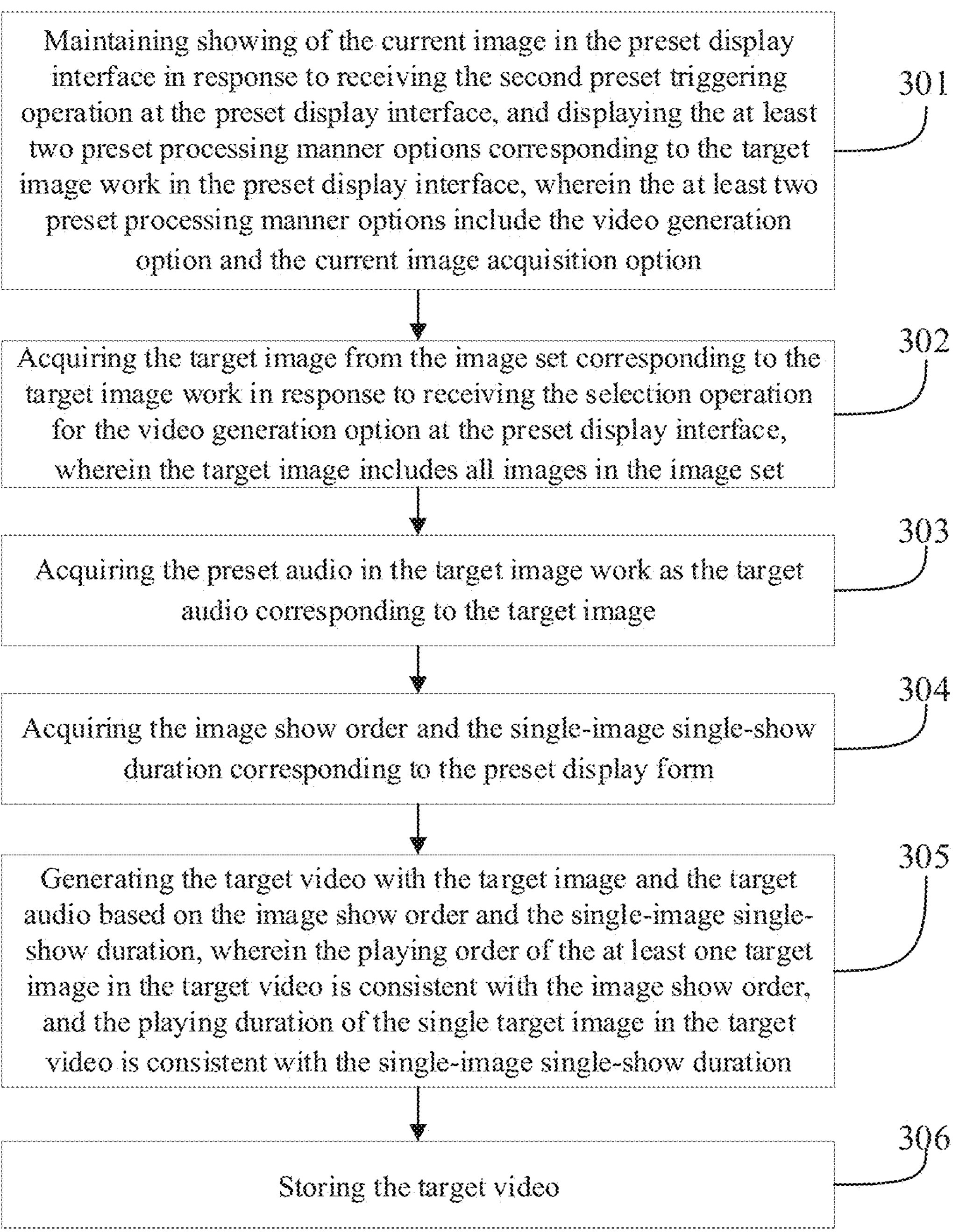
FIG. 3 is a flowchart schematic diagram of another image processing method according to an embodiment of the present disclosure.

FIG. 3 is a schematic flow diagram of an image processing method according to an embodiment of the present disclosure, which is described on the basis of various alternatives in the above embodiments, the method includes the following steps.

S301, maintaining showing of the current image in the preset display interface in response to receiving the second preset triggering operation at the preset display interface, and displaying the at least two preset processing manner options corresponding to the target image work in the preset display interface, wherein the at least two preset processing manner options include the video generation option and the current image acquisition option.

Illustratively, the target image work is a posted image work, the current user (which may be the author of the image work or any user other than the author) may view the target image work in the preset display interface, the images in the target image work are stored in an image format at the service terminal of the preset application, and the preset audio is included in the target image work. Note that the target image work may also be a work to be posted, in which case the current user is the author of the image work to be posted, and the current user may preview the target image work in the preset display interface.

Figure 4:
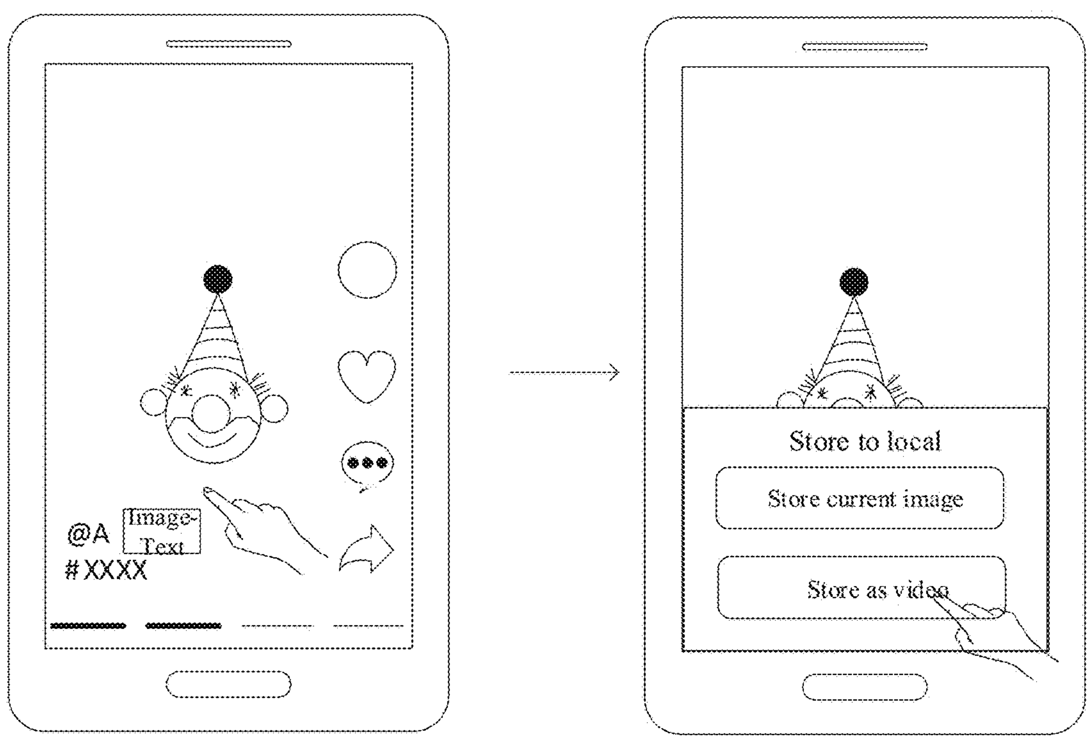
FIG. 4 is an interface interaction diagram of another image processing method according to an embodiment of the present disclosure.
Figure 4:
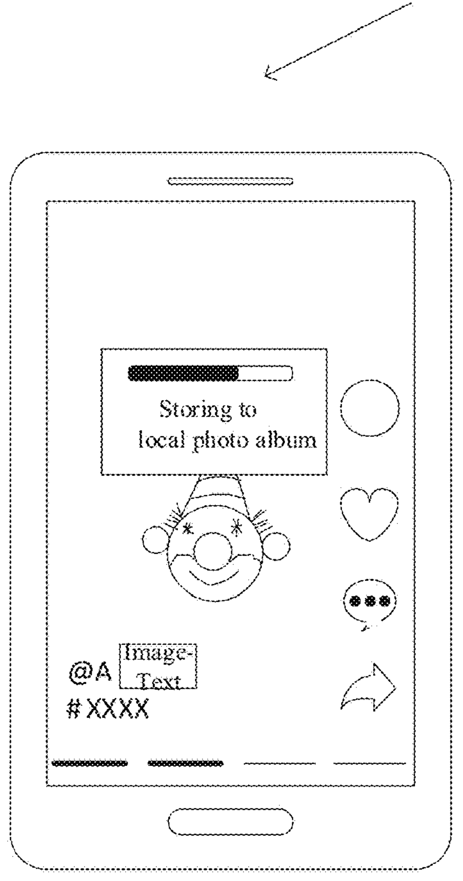

FIG. 4 is an interface interaction diagram of another image processing method provided by an embodiment of the present disclosure. As shown in FIG. 4, the second preset triggering operation may be, for example, a long press operation. After the current user inputted the second preset triggering operation, the preset processing manner options list is displayed, and the list contains the current image storing option and a store as video option.

S302, acquiring the target image from the image set corresponding to the target image work in response to receiving the selection operation for the video generation option at the preset display interface, wherein the target image includes all images in the image set.

As shown in FIG. 4, after the current user input the selection operation (e.g., a click operation) for the store as video option, it is confirmed that the user needs to convert the target image work into a video and save to local, the all images in the image set are acquired from the corresponding service terminal.

S303, acquiring the preset audio in the target image work as the target audio corresponding to the target image.

Exemplarily, the preset audio in the target image work is acquired from the corresponding service terminal.

S304, acquiring the image show order and the single-image single-show duration corresponding to the preset display form.

S305, generating the target video using the target image and the target audio based on the image show order and the single-image single-show duration, wherein the playing order of the at least one target image in the target video is consistent with the image show order, and the playing duration of the single target image in the target video is consistent with the single-image single-show duration.

S306, storing the target video.

In the image processing method provided by the embodiments of the present disclosure, if the current user wants to save the current image work in video form during viewing the image work posted by other users in the preset display interface, the second preset triggering operation may be inputted in the preset display interface to trigger showing the store as video option, and after selecting the option, the application program may automatically acquire the image and audio in the image work, and generate a video with similar visual effect according to the display form of the image work, satisfying the user's image work storing needs.

Figure 5:
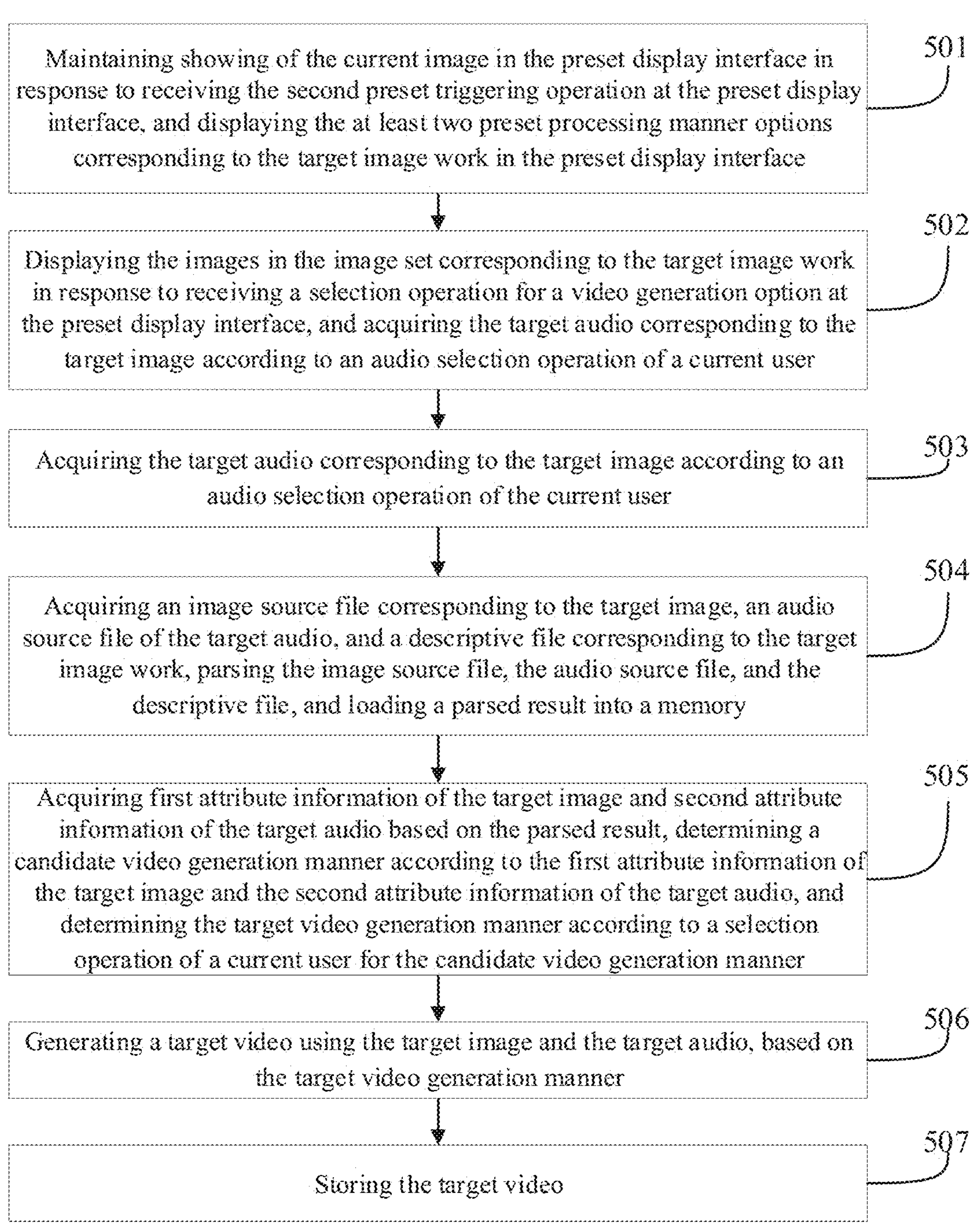
FIG. 5 is a schematic flow diagram of yet another image processing method according to an embodiment of the present disclosure.

FIG. 5 is a schematic flow diagram of yet another image processing method according to an embodiment of the present disclosure, which is described on the basis of each of the alternatives in the above embodiment, the method includes the following steps.

S501, maintaining showing of the current image in the preset display interface in response to receiving the second preset triggering operation at the preset display interface, and displaying the at least two preset processing manner options corresponding to the target image work in the preset display interface.

Exemplarily, the target image work is the image work to-be-posted, the current user is the author of the image work to-be-posted, the current user may preview the target image work in the preset display interface. The image in the target image work is stored in the image format in the service terminal of the preset application or in the electronic device local, and the target image work further includes the preset audio.

Figure 6:
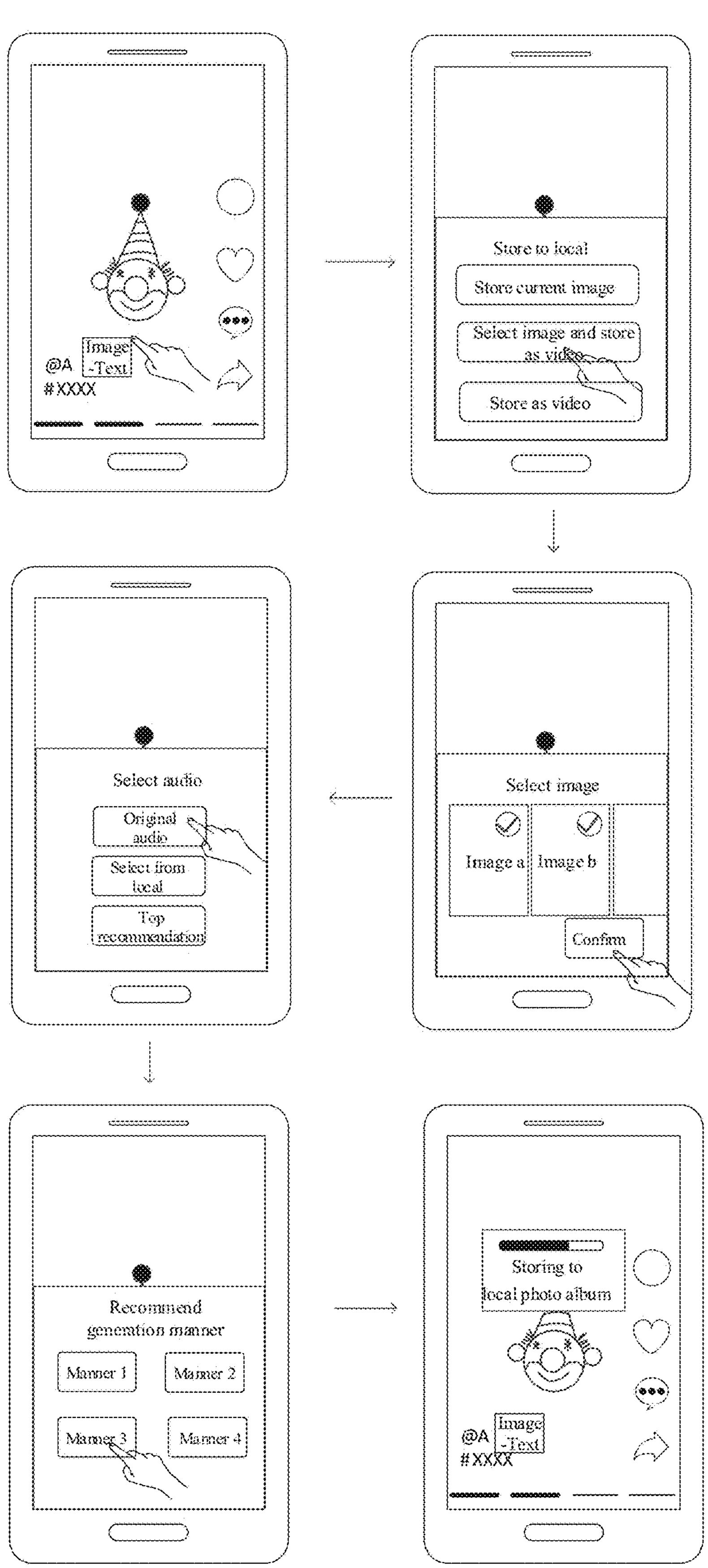
FIG. 6 is an interface interaction diagram yet another of image processing method according to an embodiment of the present disclosure.

As shown in FIG. 6, the second preset triggering operation may be, for example, a long press operation, and after the current user input the second preset triggering operation, the preset processing manner options list is displayed, and the list contains a current image storing option, a store as video option, and a select image and store as video option.

S502, displaying the images in the image set corresponding to the target image work in response to receiving a selection operation for a video generation option at the preset display interface, and acquiring the target audio corresponding to the target image according to an audio selection operation of a current user.

As shown in FIG. 6, after the current user clicks on the image store as video option, the images in the image set and the selection box associated with each image are displayed, and the user checks the image a and the image b in sequence, and the image a and the image b are acquired as the target images.

S503, acquiring the target audio corresponding to the target image according to an audio selection operation of the current user.

Illustratively, as shown in FIG. 6, various audio selection manners may be provided in the preset display interface, such as selecting the original audio of the target image work, selecting the audio locally from the electronic device, or recommending top audio to the user by the preset application.

S504, acquiring an image source file corresponding to the target image, an audio source file of the target audio, and a descriptive file corresponding to the target image work, parsing the image source file, the audio source file, and the descriptive file, and loading a parsed result into a memory.

S505, acquiring first attribute information of the target image and second attribute information of the target audio based on the parsed result, determining a candidate video generation manner according to the first attribute information of the target image and the second attribute information of the target audio, and determining the target video generation manner according to a selection operation of a current user for the candidate video generation manner.

For example, after both the target image and the target audio are selected, the candidate video generation manner may be automatically determined and recommended to the current user based on the attribute information such as the number and image content of the target image, and the attribute information such as a duration and a song type of the target audio, such as the four manners shown in FIG. 6, and the final adopted target video generation manner may be determined based on the user's selection operation.

S506, generating a target video using the target image and the target audio, based on the target video generation manner.

S507, storing the target video.

In the image processing method provided by the embodiments of the present disclosure, if the current user wants to save the current image work in video form in the process of previewing the image work to-be-posted created by himself in the preset display interface, the second preset triggering operation can be inputted in the preset display interface to trigger displaying the store as video option, and after selecting the option, the target image, the target audio and the target video generation manner for generating video can be selected according to his own needs, the image work can be converted into video for storing, and the user's personalized storing needs of the image work can be satisfied.

Figure 7:
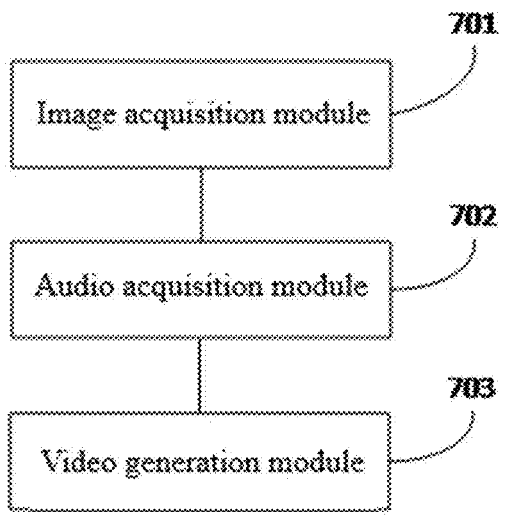
FIG. 7 is a structural block diagram of an image processing apparatus according to an embodiment of the present disclosure.

FIG. 7 is a structural block diagram of an image processing apparatus according to an embodiment of the present disclosure, which may be implemented by software and/or hardware, may be generally integrated in an electronic device, and may perform image processing by executing an image processing method. As shown in FIG. 7, the apparatus includes the following modules.

An image acquisition module 701 configured to acquire at least one target image from an image set corresponding to a target image work in response to receiving a first preset triggering operation on a preset display interface, wherein the target image work is displayed in a preset display form in the preset display interface, and the target image work includes at least one of an image work to-be-posted or a posted image work.

An audio acquisition module 702 configured to acquire a target audio corresponding to the at least one target image.

A video generation module 703 configured to generate a target video with the at least one target image and the target audio, wherein the target video is configured to be storable.

An image processing apparatus provided in an embodiment of the present disclosure, a target image is acquired from an image set corresponding to a target image work corresponds in response to receiving a first preset triggering operation on a preset display interface in which the target image work is displayed in a preset display form, the target image work includes at least one of an image work to-be-posted or a posted image work. A target audio corresponding to at least one target image is acquired, and a target video is generated with the at least one target image and the target audio, and the target video is configured to be storable. By adopting the above technical solution, a completely new way of processing image works is provided, which can be saved in video form or forwarded outside the current application, which can enable easier sharing of image works between users.

Optionally, the target audio includes a preset audio, and the at least one target image includes all images of the image set. The video generation module is configured to generate the target video with the at least one target image and the target audio by: acquire a preset image show order and a single-image single-show duration; and generate a target video using the target images and the target audio based on the image show order and the single-image single-show duration, wherein a playing order of the at least one target image in the target video coincides with the image show order, and a playing duration of a single target image in the target video coincides with the single-image single-show duration.

Optionally, acquire the preset image show order and the single image show duration includes: acquire an image show order and a single-image single-show duration that are set by a user who creates the target image work as the preset image show order and the single-image single-show duration.

Optionally, the preset display form includes showing images in the image set in sequence in a process of playing the preset audio; wherein acquire the preset image show order and the single image show duration includes: acquire an image show order and a single-image single-show duration corresponding to the preset display form as the preset image show order and the single-image single-show duration.

Optionally, the preset audio is an audio set by a user who creates the target image work or the preset audio is an audio in the target image work.

Optionally, the apparatus further include:

An option show module configured to, before acquiring at least one target image from the image set corresponding to the target image work corresponds in response to receiving the first preset triggering operation on the preset display interface, show at least two preset processing manner options corresponding to the target image work in the preset display interface in response to receiving a second preset triggering operation at the preset display interface, wherein the at least two preset processing manner options comprise a video generation option.

The image acquisition module is configured to show at least two preset processing manner options corresponding to the target image work in the preset display interface in response to receiving the second preset triggering operation at the preset display interface by: a video generation option acquiring at least one target image from an image set corresponding to the target image work in response to receiving a selection operation for the video generation option at the preset display interface.

Optionally, the at least two preset processing manner options further include a current image acquisition option.

The option show module is configured to show the at least two preset processing manner options corresponding to the target image work in the preset display interface in response to receiving a second preset triggering operation at the preset display interface by: maintain show of a current image in the preset display interface in response to receiving the second preset triggering operation at the preset display interface and show the at least two preset processing manner options corresponding to the target image work in the preset display interface.

Optionally, the video generation module is configured to generate the target video with the at least one target image and the target audio by: determine a target video generation manner, wherein the target video generation manner includes at least one selected from the group consisting of an image playing order, a single image playing duration, a playing switching effect of neighbor images, an association of an image playing timing and a tempo of the target audio, and a video playing total duration; and generate, based on the target video generation manner, the target video using the target image and the target audio.

Optionally, the video generation module is configured to determine the target video generation manner by: acquire at least one of an image source file corresponding to the target image or an audio source file of the target audio, and a descriptive file corresponding to the target image work, parse at least one of the image source file or the audio source file, or the descriptive file, and load the parsed result into a memory; acquire at least one of first attribute information of the target image or second attribute information of the target audio based on the parsed result, determine a candidate video generation manner according to at least one of the first attribute information of the target image or the second attribute information of the target audio; and determine the target video generation manner according to a selection operation of a current user for the candidate video generation manner. Optionally, when the target image work includes text information, the source file corresponding to the text information can also be acquired, and the target video can be synthesized based on at least one of the image source file corresponding to the target image or the audio source file of the target audio, the descriptive file corresponding to the target image work and the text information.

Optionally, the image acquisition is configured to acquire the target image from the image set corresponding to the target image work by: acquire a corresponding target image according to a selection operation of a current user for an image in the image set corresponding to the target image work.

Optionally, the audio acquisition is configured to acquire the target audio corresponding to the target image by: acquire the target audio corresponding to the target image according to an audio selection operation of a current user.

Figure 8:
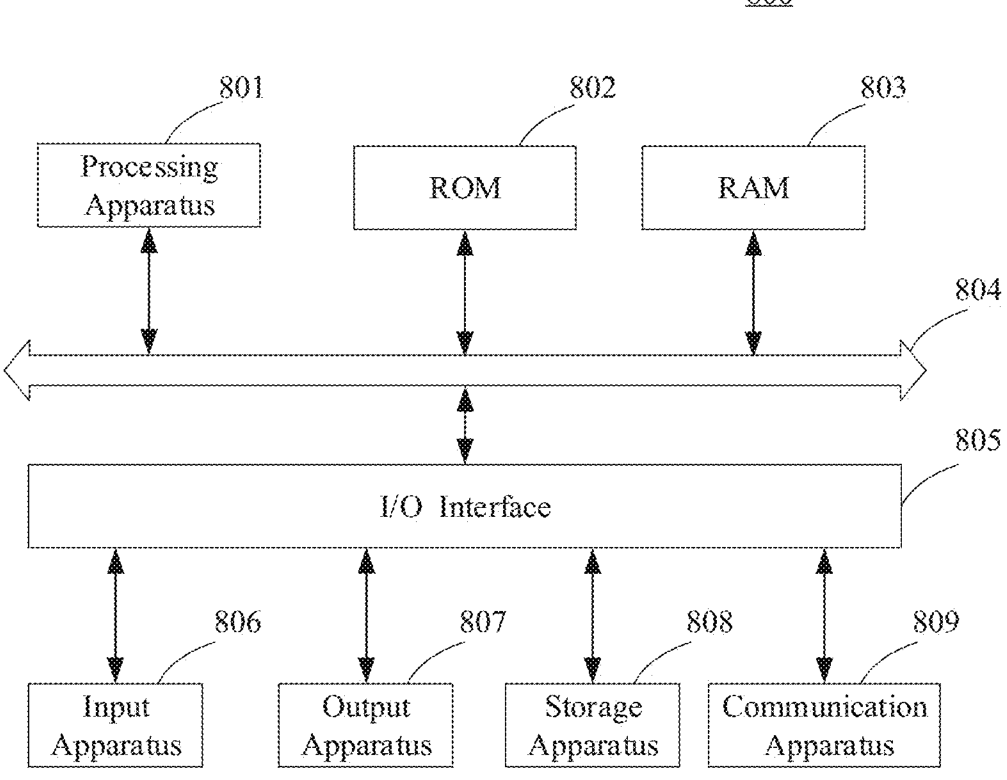
FIG. 8 is a structural block diagram of an electronic device according to an embodiment of the present disclosure.

Referring to FIG. 8, FIG. 8 illustrates a schematic structural diagram of an electronic device 800 suitable for implementing some embodiments of the present disclosure. The electronic devices in some embodiments of the present disclosure may include but are not limited to mobile terminals such as a mobile phone, a notebook computer, a digital broadcasting receiver, a personal digital assistant (PDA), a portable Android device (PAD), a portable media player (PMP), a vehicle-mounted terminal (e.g., a vehicle-mounted navigation terminal), a wearable electronic device or the like, and fixed terminals such as a digital TV, a desktop computer, or the like. The electronic device illustrated in FIG. 8 is merely an example, and should not pose any limitation to the functions and the range of use of the embodiments of the present disclosure.

As illustrated in FIG. 5, the electronic device 800 may include a processing apparatus 801 (e.g., a central processing unit, a graphics processing unit, etc.), which can perform various suitable actions and processing according to a program stored in a read-only memory (ROM) 802 or a program loaded from a storage apparatus 808 into a random-access memory (RAM) 803. The RAM 803 further stores various programs and data required for operations of the electronic device 800. The processing apparatus 801, the ROM 802, and the RAM 803 are interconnected by means of a bus 804. An input/output (I/O) interface 805 is also connected to the bus 804.

Usually, the following apparatus may be connected to the I/O interface 805: an input apparatus 806 including, for example, a touch screen, a touch pad, a keyboard, a mouse, a camera, a microphone, an accelerometer, a gyroscope, or the like; an output apparatus 807 including, for example, a liquid crystal display (LCD), a loudspeaker, a vibrator, or the like; a storage apparatus 808 including, for example, a magnetic tape, a hard disk, or the like; and a communication apparatus 809. The communication apparatus 809 may allow the electronic device 800 to be in wireless or wired communication with other devices to exchange data. While FIG. 5 illustrates the electronic device 800 having various apparatuses, it should be understood that not all of the illustrated apparatuses are necessarily implemented or included. More or fewer apparatuses may be implemented or included alternatively.

Particularly, according to some embodiments of the present disclosure, the processes described above with reference to the flowcharts may be implemented as a computer software program. For example, some embodiments of the present disclosure include a computer program product, which includes a computer program carried by a non-transitory computer-readable medium. The computer program includes program codes for performing the methods shown in the flowcharts. In such embodiments, the computer program may be downloaded online through the communication apparatus 809 and installed, or may be installed from the storage apparatus 808, or may be installed from the ROM 802. When the computer program is executed by the processing apparatus 801, the above-mentioned functions defined in the methods of some embodiments of the present disclosure are performed.

It should be noted that the above-mentioned computer-readable medium in the present disclosure may be a computer-readable signal medium or a computer-readable storage medium or any combination thereof. For example, the computer-readable storage medium may be, but not limited to, an electric, magnetic, optical, electromagnetic, infrared, or semiconductor system, apparatus or device, or any combination thereof. More specific examples of the computer-readable storage medium may include but not be limited to: an electrical connection with one or more wires, a portable computer disk, a hard disk, a random-access memory (RAM), a read-only memory (ROM), an erasable programmable read-only memory (EPROM or flash memory), an optical fiber, a compact disk read-only memory (CD-ROM), an optical storage device, a magnetic storage device, or any appropriate combination of them. In the present disclosure, the computer-readable storage medium may be any tangible medium containing or storing a program that can be used by or in combination with an instruction execution system, apparatus or device. In the present disclosure, the computer-readable signal medium may include a data signal that propagates in a baseband or as a part of a carrier and carries computer-readable program codes. The data signal propagating in such a manner may take a plurality of forms, including but not limited to an electromagnetic signal, an optical signal, or any appropriate combination thereof. The computer-readable signal medium may also be any other computer-readable medium than the computer-readable storage medium. The computer-readable signal medium may send, propagate or transmit a program used by or in combination with an instruction execution system, apparatus or device. The program code contained on the computer-readable medium may be transmitted by using any suitable medium, including but not limited to an electric wire, a fiber-optic cable, radio frequency (RF) and the like, or any appropriate combination of them.

In some implementation modes, the client and the server may communicate with any network protocol currently known or to be researched and developed in the future such as hypertext transfer protocol (HTTP), and may communicate (via a communication network) and interconnect with digital data in any form or medium. Examples of communication networks include a local area network (LAN), a wide area network (WAN), the Internet, and an end-to-end network (e.g., an ad hoc end-to-end network), as well as any network currently known or to be researched and developed in the future.

The above-mentioned computer-readable medium may be included in the above-mentioned electronic device, or may also exist alone without being assembled into the electronic device.

The above-mentioned computer-readable medium carries one or more programs, and when the one or more programs are executed by the electronic device, the electronic device is caused to: acquire at least one target image from an image set corresponding to a target image work in response to receiving a first preset triggering operation on a preset display interface, wherein the target image work is displayed in a preset display form in the preset display interface, and the target image work includes at least one of an image work to-be-posted or a posted image work; and acquire a target audio corresponding to the target image, and generate a target video with the at least one target image and the target audio, wherein the target video is configured to be storable.

The computer program codes for performing the operations of the present disclosure may be written in one or more programming languages or a combination thereof. The above-mentioned programming languages include but are not limited to object-oriented programming languages such as Java, Smalltalk, C++, and also include conventional procedural programming languages such as the "C" programming language or similar programming languages. The program code may be executed entirely on the user's computer, partly on the user's computer, as a stand-alone software package, partly on the user's computer and partly on a remote computer, or entirely on the remote computer or server. In the scenario related to the remote computer, the remote computer may be connected to the user's computer through any type of network, including a local area network (LAN) or a wide area network (WAN), or the connection may be made to an external computer (for example, through the Internet using an Internet service provider).

The flowcharts and block diagrams in the accompanying drawings illustrate the architecture, functionality, and operation of possible implementations of systems, methods, and computer program products according to various embodiments of the present disclosure. In this regard, each block in the flowcharts or block diagrams may represent a module, a program segment, or a portion of codes, including one or more executable instructions for implementing specified logical functions. It should also be noted that, in some alternative implementations, the functions noted in the blocks may also occur out of the order noted in the accompanying drawings. For example, two blocks shown in succession may, in fact, can be executed substantially concurrently, or the two blocks may sometimes be executed in a reverse order, depending upon the functionality involved. It should also be noted that, each block of the block diagrams and/or flowcharts, and combinations of blocks in the block diagrams and/or flowcharts, may be implemented by a dedicated hardware-based system that performs the specified functions or operations, or may also be implemented by a combination of dedicated hardware and computer instructions.

The modules or units involved in the embodiments of the present disclosure may be implemented in software or hardware. Among them, the name of the module or unit does not constitute a limitation of the unit itself under certain circumstances.

The functions described herein above may be performed, at least partially, by one or more hardware logic components. For example, without limitation, available exemplary types of hardware logic components include: a field programmable gate array (FPGA), an application specific integrated circuit (ASIC), an application specific standard product (ASSP), a system on chip (SOC), a complex programmable logical device (CPLD), etc.

In the context of the present disclosure, the machine-readable medium may be a tangible medium that may include or store a program for use by or in combination with an instruction execution system, apparatus or device. The machine-readable medium may be a machine-readable signal medium or a machine-readable storage medium. The machine-readable medium includes, but is not limited to, an electrical, magnetic, optical, electromagnetic, infrared, or semi-conductive system, apparatus or device, or any suitable combination of the foregoing. More specific examples of machine-readable storage medium include electrical connection with one or more wires, portable computer disk, hard disk, random-access memory (RAM), read-only memory (ROM), erasable programmable read-only memory (EPROM or flash memory), optical fiber, portable compact disk read-only memory (CD-ROM), optical storage device, magnetic storage device, or any suitable combination of the foregoing.

According to one or more embodiments of the present disclosure, an image processing method is provided, including:

acquiring at least one target image from an image set corresponding to a target image work in response to receiving a first preset triggering operation on a preset display interface, wherein the target image work is displayed in a preset display form in the preset display interface, and the target image work includes at least one of an image work to-be-posted or a posted image work; and acquiring a target audio corresponding to the target image, and generating a target video with the at least one target image and the target audio, wherein the target video is configured to be storable.

Optionally, the target audio includes a preset audio, the at least one target image includes all images of the image set;

wherein generating the target video with the at least one target image and the target audio includes:

acquiring a preset image show order and a single-image single-show duration; and generating a target video using the target images and the target audio based on the image show order and the single-image single-show duration, wherein a playing order of the at least one target image in the target video coincides with the image show order, and a playing duration of a single target image in the target video coincides with the single-image single-show duration.

Optionally, acquiring the preset image show order and the single image show duration includes: acquiring an image show order and a single-image single-show duration that are set by a user who creates the target image work as the preset image show order and the single-image single-show duration.

Optionally, the preset audio is an audio set by a user who creates the target image work or the preset audio is an audio in the target image work.

Optionally, the preset display form includes showing images in the image set in sequence in a process of playing the preset audio;

wherein acquiring the preset image show order and the single image show duration includes:

acquiring an image show order and a single-image single-show duration corresponding to the preset display form as the preset image show order and the single-image single-show duration.

Optionally, before acquiring at least one target image from the image set corresponding to the target image work corresponds in response to receiving the first preset triggering operation on the preset display interface, the method further comprising:

showing at least two preset processing manner options corresponding to the target image work in the preset display interface in response to receiving a second preset triggering operation at the preset display interface, wherein the at least two preset processing manner options include a video generation option;

wherein showing at least two preset processing manner options corresponding to the target image work in the preset display interface in response to receiving the second preset triggering operation at the preset display interface includes:

acquiring at least one target image from an image set corresponding to the target image work in response to receiving a selection operation for the video generation option at the preset display interface.

Optionally, the at least two preset processing manner options further include a current image acquisition option;

wherein showing the at least two preset processing manner options corresponding to the target image work in the preset display interface in response to receiving a second preset triggering operation at the preset display interface includes:

maintaining showing of a current image in the preset display interface in response to receiving the second preset triggering operation at the preset display interface, and showing the at least two preset processing manner options corresponding to the target image work in the preset display interface.

Optionally, generating the target video with the at least one target image and the target audio includes:

determining a target video generation manner, wherein the target video generation manner includes at least one selected from the group consisting of an image playing order, a single image playing duration, a playing switching effect of neighbor images, an association of an image playing timing and a tempo of the target audio, and a video playing total duration; and generating, based on the target video generation manner, the target video using the target image and the target audio.

Optionally, determining the target video generation manner includes:

acquiring at least one of an image source file corresponding to the target image or an audio source file of the target audio, and a descriptive file corresponding to the target image work, parsing at least one of the image source file or the audio source file, or the descriptive file, and loading a parsed result into a memory;

acquiring at least one of first attribute information of the target image or second attribute information of the target audio based on the parsed result, determining a candidate video generation manner according to at least one of the first attribute information of the target image or the second attribute information of the target audio; and determining the target video generation manner according to a selection operation of a current user for the candidate video generation manner.

Optionally, acquiring the target image from the image set corresponding to the target image work includes:

acquiring a corresponding target image according to a selection operation of a current user for an image in the image set corresponding to the target image work.

Optionally, acquiring the target audio corresponding to the target image includes:

acquiring the target audio corresponding to the target image according to an audio selection operation of a current user.

According to one or more embodiments of the present disclosure, an image processing apparatus is provided, including:

an image acquisition module configured to acquire at least one target image from an image set corresponding to a target image work in response to receiving a first preset triggering operation on a preset display interface, wherein the target image work is displayed in a preset display form in the preset display interface, and the target image work includes at least one of an image work to-be-posted or a posted image work;

an audio acquisition module configured to acquire a target audio corresponding to the at least one target image; and a video generation module configured to generate a target video with the at least one target image and the target audio, wherein the target video is configured to be storable.

In addition, while operations have been described in a particular order, it shall not be construed as requiring that such operations are performed in the stated specific order or sequence. Under certain circumstances, multitasking and parallel processing may be advantageous. Similarly, while some specific implementation details are included in the above discussions, these shall not be construed as limitations to the present disclosure. Some features described in the context of a separate embodiment may also be combined in a single embodiment. Rather, various features described in the context of a single embodiment may also be implemented separately or in any appropriate sub-combination in a plurality of embodiments.

What is claimed is:

1. A method of image processing, comprising:

presenting at least two options corresponding to a first image work in a first display interface in response to receiving a second triggering operation on the first display interface, wherein the at least two options indicate processing manners for the first image work, and the at least two options comprise a video generation option;

acquiring at least one first image from an image set corresponding to the first image work in response to receiving a first triggering operation on a first display interface, wherein the first image work is displayed in a first display form in the first display interface, and the first image work comprises an image work to be posted or a posted image work; and acquiring a fourth audio corresponding to the at least one first image and generating a first video using the at least one first image and the fourth audio, wherein the first video is configured to be storable.

2. The method according to claim 1, wherein the fourth audio comprises a third audio, the at least one first image comprises all images of the image set, wherein the generating the first video with the at least one first image and the fourth audio comprises:

acquiring a first image show order and a single-image single-show duration; and generating the first video using the at least one first image and the fourth audio based on the image show order and the single-image single-show duration, wherein a playing order of the at least one first image in the first video coincides with the image show order, and a playing duration of a single first image in the first video coincides with the single-image single-show duration.

3. The method according to claim 2, wherein the acquiring the first image show order and the single-image single-show duration comprises:

acquiring an image show order and a single-image single-show duration that are set by a user who creates the first image work as the first image show order and the single-image single-show duration.

4. The method according to claim 2, wherein the first display form comprises showing images in the image set in sequence in a process of playing the third audio;

wherein the acquiring the first image show order and the single-image single-show duration comprises:

acquiring an image show order and a single-image single-show duration corresponding to the first display form as the first image show order and the single-image single-show duration.

5. The method according to claim 1, wherein the third audio is an audio set by a user who creates the first image work or the third audio is an audio in the first image work.

6. The method according to claim 1, wherein the acquiring the at least one first image from the image set corresponding to the first image work in response to receiving the first triggering operation on the first display interface comprises:

acquiring the at least one first image from an image set corresponding to the first image work in response to receiving a selection operation for the video generation option at the first display interface.

7. The method according to claim 6, wherein the at least two options further comprise a current image acquisition option, wherein the presenting the at least two options corresponding to the first image work in the first display interface in response to receiving the second triggering operation on the first display interface comprises:

maintaining presenting of a current image in the first display interface in response to receiving the second triggering operation on the first display interface, and showing the at least two options corresponding to the first image work in the first display interface.

8. The method according to claim 1, wherein the generating the first video with the at least one first image and the fourth audio comprises:

determining a first video generation manner, wherein the first video generation manner comprises at least one selected from a group consisting of an image playing order, a single image playing duration, a playing switching effect of neighbor images, an association of an image playing timing and a tempo of the fourth audio, and a video playing total duration; and generating, based on the first video generation manner, the first video using the at least one first image and the fourth audio.

9. The method according to claim 8, wherein the determining the first video generation manner comprises:

acquiring an image source file corresponding to the at least one first image or an audio source file of the fourth audio, and a descriptive file corresponding to the first image work, and parsing the image source file or the audio source file, and the descriptive file, and loading a parsed result into a memory;

acquiring first attribute information of the at least one first image or second attribute information of the fourth audio based on the parsed result, determining a candidate video generation manner according to the first attribute information of the at least one first image or the second attribute information of the fourth audio; and determining the first video generation manner according to a selection operation of a current user for the candidate video generation manner.

10. The method according to claim 1, wherein the acquiring the fourth audio corresponding to the at least one first image comprises:

acquiring a corresponding first image according to a selection operation of a current user for an image in the image set corresponding to the first image work.

11. The method according to claim 1, wherein the acquiring the fourth audio corresponding to the at least one first image comprises:

acquiring the fourth audio corresponding to the at least one first image according to an audio selection operation of a current user.

12. An electronic device comprising:

at least one processor; and a non-transitory memory with instructions thereon, wherein the instructions upon execution by the processor, cause the processor to implement a method comprising:

presenting at least two options corresponding to a first image work in a first display interface in response to receiving a second triggering operation on the first display interface, wherein the at least two options indicate processing manners for the first image work, and the at least two options comprise a video generation option;

acquiring at least one first image from an image set corresponding to the first image work in response to receiving a first triggering operation on a first display interface, wherein the first image work is displayed in a first display form in the first display interface, and the first image work comprises an image work to be posted or a posted image work; and acquiring a fourth audio corresponding to the at least one first image and generating a first video using the at least one first image and the fourth audio, wherein the first video is set to be storable.

13. A non-transitory computer-readable storage medium, on which a computer program is stored, wherein when the computer program is executed by a processor, the processor implements a method comprising:

presenting at least two options corresponding to a first image work in a first display interface in response to receiving a second triggering operation on the first display interface, wherein the at least two options indicate processing manners for the first image work, and the at least two options comprise a video generation option;

acquiring at least one first image from an image set corresponding to the first image work in response to receiving a first preset triggering operation on a first display interface, wherein the first image work is displayed in a first display form in the first display interface, and the first image work comprises an image work to be posted or a posted image work; and acquiring a fourth audio corresponding to the at least one first image and generating a first video using the at least one first image and the fourth audio, wherein the first video is set to be storable.

14. The electronic device according to claim 12, wherein the fourth audio comprises a third audio, the at least one first image comprises all images of the image set, wherein the processor is further caused to:

acquire the first image show order and a single-image single-show duration; and generate the first video using the at least one first image and the fourth audio based on the image show order and the single-image single-show duration, wherein a playing order of the at least one first image in the first video coincides with the image show order, and a playing duration of a single first image in the first video coincides with the single-image single-show duration.

15. The electronic device according to claim 12, wherein the third audio is an audio set by a user who creates the first image work or the third audio is an audio in the first image work.

16. The electronic device according to claim 12, wherein the processor is further caused to:

acquire at least one first image from an image set corresponding to the first image work in response to receiving a selection operation for the video generation option at the first display interface.

17. The electronic device according to claim 12, wherein the processor is further caused to:

determine a first video generation manner, wherein the first video generation manner comprises at least one selected from a group consisting of an image playing order, a single image playing duration, a playing switching effect of neighbor images, an association of an image playing timing and a tempo of the fourth audio, and a video playing total duration; and generate, based on the first video generation manner, the first video using the at least one first image and the fourth audio.

18. The electronic device according to claim 17, wherein the processor is further caused to:

acquire an image source file corresponding to the at least one first image or an audio source file of the fourth audio, and a descriptive file corresponding to the first image work, and parsing the image source file or the audio source file, and the descriptive file, and loading a parsed result into a memory;

acquire first attribute information of the at least one first image or second attribute information of the fourth audio based on the parsed result, determining a candidate video generation manner according to the first attribute information of the at least one first image or the second attribute information of the fourth audio; and determine the first video generation manner according to a selection operation of a current user for the candidate video generation manner.

19. The electronic device according to claim 12, wherein the acquiring the fourth audio corresponding to the at least one first image comprises:

acquiring a corresponding first image according to a selection operation of a current user for an image in the image set corresponding to the first image work.

20. The electronic device according to claim 12, wherein the acquiring the fourth audio corresponding to the first image comprises:

acquiring the fourth audio corresponding to the at least one first image according to an audio selection operation of a current user.

* * * * *